United States Patent [19]

Larrick

[11] 4,135,784
[45] Jan. 23, 1979

[54] REAR SCREEN OPTIC PROJECTION APPARATUS

[76] Inventor: Robert B. Larrick, 1450 Hawthorne Ave., Columbus, Ohio 43203

[21] Appl. No.: 823,514

[22] Filed: Aug. 10, 1977

[51] Int. Cl.² ............................................. G03B 21/56
[52] U.S. Cl. .................................... 350/122; 352/104; 353/78; 355/21; 355/45
[58] Field of Search .................... 350/122; 355/21, 45; 352/104; 353/74, 77, 78

[56] References Cited
U.S. PATENT DOCUMENTS

| | | | |
|---|---|---|---|
| 2,231,395 | 2/1941 | Schlegel | 355/45 X |
| 2,338,400 | 1/1944 | Bogue | 355/45 X |
| 3,051,040 | 8/1962 | Davis | 352/104 X |

Primary Examiner—Richard A. Wintercorn
Attorney, Agent, or Firm—Mahoney & Stebens

[57] ABSTRACT

A rear screen optic projection apparatus is provided having a multiple mirror reflection system mounted in a supporting enclosure and adapted for utilization with photographic projection equipment such as slide projectors and motion picture projectors. The reflector-type optic system of this apparatus includes three mirrors which are angularly displaced with respect to each other for providing a substantially long optical path from the projector to a viewing screen. The supporting structure is designed with a viewing screen and an entrance aperture for an image to be projected along the optical path. A plurality of the apparatus in a stored configuration by covering the viewing screen and closing the entrance aperture. Two door closure elements are provided the one element including two sections that pivot about respective vertical axes at each side of the aperture with the other door element pivoted about a horizontal axis to form an inverted U-shaped channel with the first door element when in an open configuration and thus shield the interior from ambient light that could otherwise enter the optical path through the aperture and interfere with the image to be projected.

15 Claims, 6 Drawing Figures

REAR SCREEN OPTIC PROJECTION APPARATUS

BACKGROUND OF THE INVENTION

This invention is directed to optical display apparatus which is of the rear screen projection type. It is particularly adapted to the viewing of photographic images which are obtained from conventional projection equipment of either the slide or motion picture type.

There is a substantial need for a relatively simple apparatus for such a viewing purpose and which meets the advantageous criteria of portability, relatively light weight construction, simplicity of construction with accompanying ease of manufacturing and assembly, facility for proper adjustment to accommodate specific projection apparatus, and ready adaptability to use with conventional projection equipment of either the slide or motion picture type.

SUMMARY OF THE INVENTION

In accordance with this invention, a rear screen projection apparatus is provided comprising a supporting enclosure or cabinet which is designed to have a substantially vertically directed optic path with the final viewing image projected onto the rear of a vertically disposed light transmitting screen mounted at the front of the cabinet. An optical system including three mirror elements is disposed within the supporting enclosure and is arranged to receive the initial image from a suitable photographic projector that is located exteriorly and adjacent to a lower portion of the enclosure. The arrangement of the three mirrors and the viewing screen is such that the projector is positioned in the front of the enclosure as is the person, or persons, desiring to view the photographic images thus projected. This optical system results in ability to project the image onto the viewing screen from the rear but having the image in proper perspective and orientation for direct viewing without requiring any inversion or reversing of the film or slide in the projecting equipment.

The three-mirror optic system of this invention has the mirrors positioned in the structure or enclosure in angularly disposed positions with respect to the optical path so that the angle of incidence on any particular mirror is substantially less than 45° and is preferably under 30°. This angular positioning of the mirros to utilize a low angle of incidence minimizes the likelihood of and effectively eliminates projecting a dual image as a consequence of reflections from both the front and back surface of the rear coated mirrors and which dual image would otherwise be multiplied by the number of mirrors in the optical system. Effective elimination of a plural image results in a sharp, clear image being formed on the viewing screen which is translucent and may either be a neutral gray or some other shade to enhance the specific projected images.

The structural enclosure includes a cabinet wherein the interior is essentially open and has the three mirrors mounted at appropriate points along an optical path and including means for proper angular adjustment of the mirrors. The cabinet also includes door-like elements which serve the dual function of providing protection for the viewing screen, when the doors are disposed to a closed configuration, and to also close the opening through which the photographic projector projects the image to the optical system whereby protecting the several mirrors. These doorlike elements include a large door for covering the viewing screen and which door opens outwardly about a horizontal hinge to either a horizontal or slightly depressed angular position. A pair of cooperating door elements are secured to the base or bottom portion of the enclosure at the same side as the viewing screen and its associated protective door with these doors hinged for swinging movement about a vertical axis. These doors which are effective in closing the aperture through which the image is projected, cooperate with the viewing screen door to form a shield around a projector that is positioned at the front of the cabinet. The objective of this shield is to prevent entrance of extraneous ambient light that would either dilute the image or introduce undesired images from the surrounding area and thus interfere with the clarity of the image projected onto the viewing screen. Additionally, the structural arrangement of the doors is such as to prevent light emanating from the projection equipment from being directly transmitted to the observer and thus interfering with the image seen on the viewing screen.

These and other objects and advantages of this invention will be readily apparent from the following detailed description of an illustrative embodiment of the invention and the accompanying drawings of that embodiment.

DESCRIPTION OF THE DRAWING FIGURES

DETAILED DESCRIPTION OF THE ILLUSTRATIVE EMBODIMENT

Figure 1:
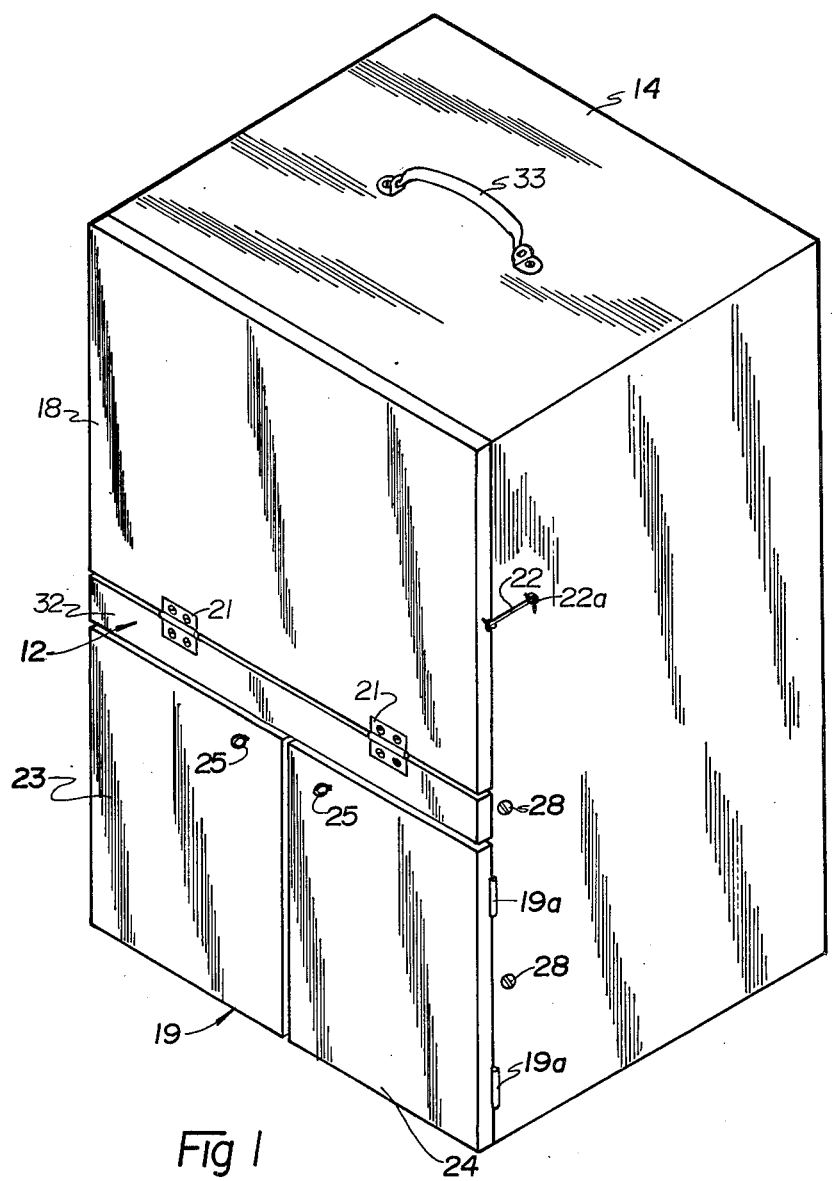
FIG. 1 is a perspective view of the rear screen viewing apparatus in a closed storage configuration.
Figure 2:
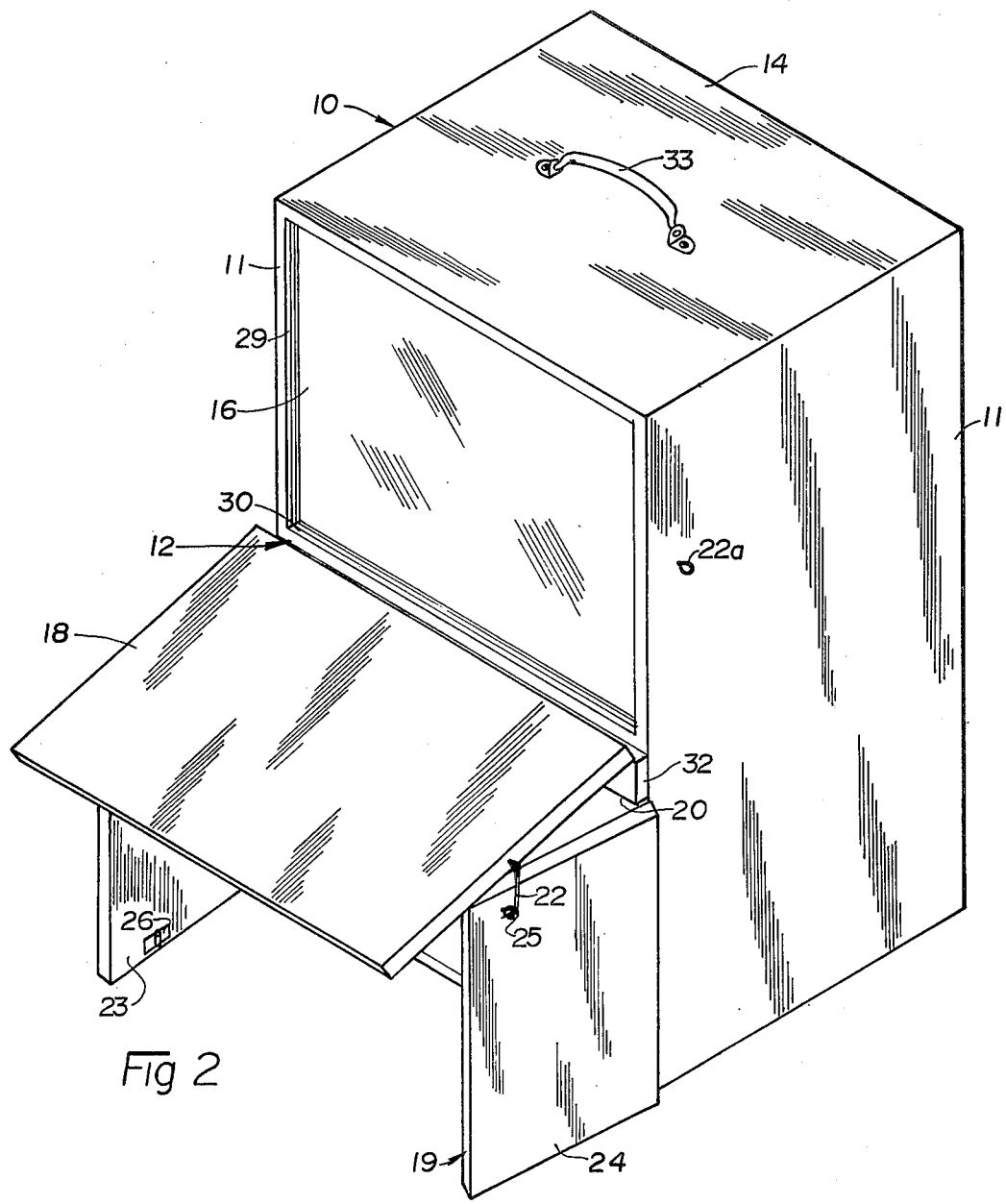
FIG. 2 is a perspective view of the viewing apparatus in an opened and operating position.

Having reference to FIGS. 1 and 2 specifically, there is shown a rear screen viewing apparatus embodying this invention in both its closed or stored configuration and an open or operating configuration. The structure comprises a support housing 10 which forms an enclosure and, in the illustrative embodiment, is a cabinet-like structure. This housing 10 includes vertical side walls 11, a front wall 12 and a rear wall 13 which can be seen in FIG. 3. These walls 11, 12 and 13 form a generally elongated tubular structure adapted to be supported in a vertical or upstanding position with respect to a suitable support surface such as a table or on the floor. The upper and lower ends of this wall structure are closed by the respective end closure walls 14 and 15. It will be noted that the bottom enclosure wall 15 is only seen in FIGS. 3 and 5 of the drawings.

Referring to FIG. 2, it will be seen that the support housing 10 is provided with a viewing screen 16 which is mounted in the front wall 12 at the upper end portion of the wall structure. An aperture 17 is formed in this same front wall 12 at the bottom of the wall structure and generally comprises a rectangular shaped opening extending substantially the width of the cabinet.

Associated with the front wall 12 are sets of hinged door elements 18 and 19 which cooperate with respective areas that include the viewing screen 16 and the aperture 17. In the illustrative embodiment, these hinged doors 18 and 19 are mounted in the housing in such a manner that when in a closed position they are essentially parallel with an intermediate or central section 20 of the front wall 12 as well as with the forwardly facing edges of the side, top and bottom walls. The upper hinged door 18 is secured to the housing by a hinge structure 21 which has its axis horizontally disposed and located at the bottom horizontal edge of that door. Accordingly, the upper door 18, which is of a size and configuration to cover the viewing screen 16 when not in use, can be opened by swinging the door outwardly and downwardly as indicated in FIG. 2, to a substantially horizontal or slightly downwardly inclined position, as will be explained hereinafter in greater detail. This door 18 is also provided with a pair of latching hooks 22 that cooperate with respective eyes 22a attached to the sidewalls 11 for securing the door in a closed position as shown in FIG. 1.

The bottom door 19 is preferably formed in accordance with the principals of this invention, in two sections 23 and 24 with these sections being mounted in the front wall of the housing to selectively close the aperture 17 as shown in FIG. 1 or to be swung to a relatively opened position as shown in FIG. 2. The two sections are mounted by hinges 19a along the vertical side edges to the respective side walls 11 of the housing and are provided with operating handles 25 that are preferably closed rings, such as screw eyes, oriented in a vertical plane. These door sections 23 and 24, are also provided with suitable fasteners 26 which are adapted to retain these door elements in a closed relationship with respect to the housing.

Figure 5:
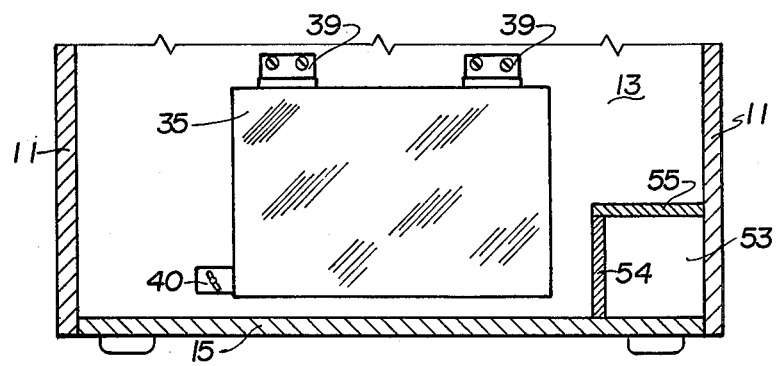
FIG. 5 is a fragmentary vertical sectional view on an enlarged scale taken along line 5—5 of FIG. 3.
Figure 4:
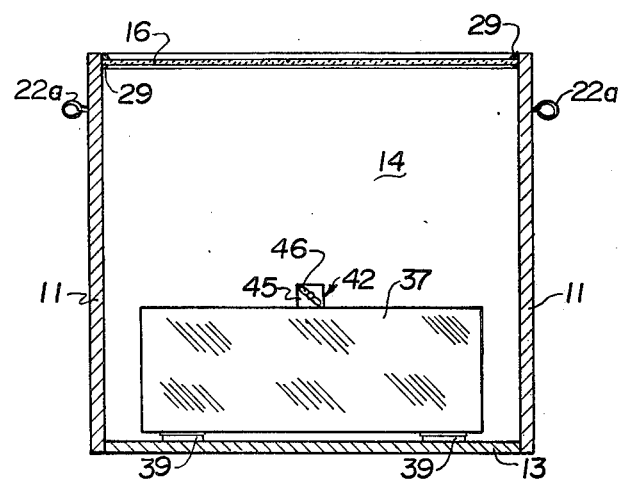
FIG. 4 is a horizontal sectional view taken along line 4—4 of FIG. 3.
Figure 3:
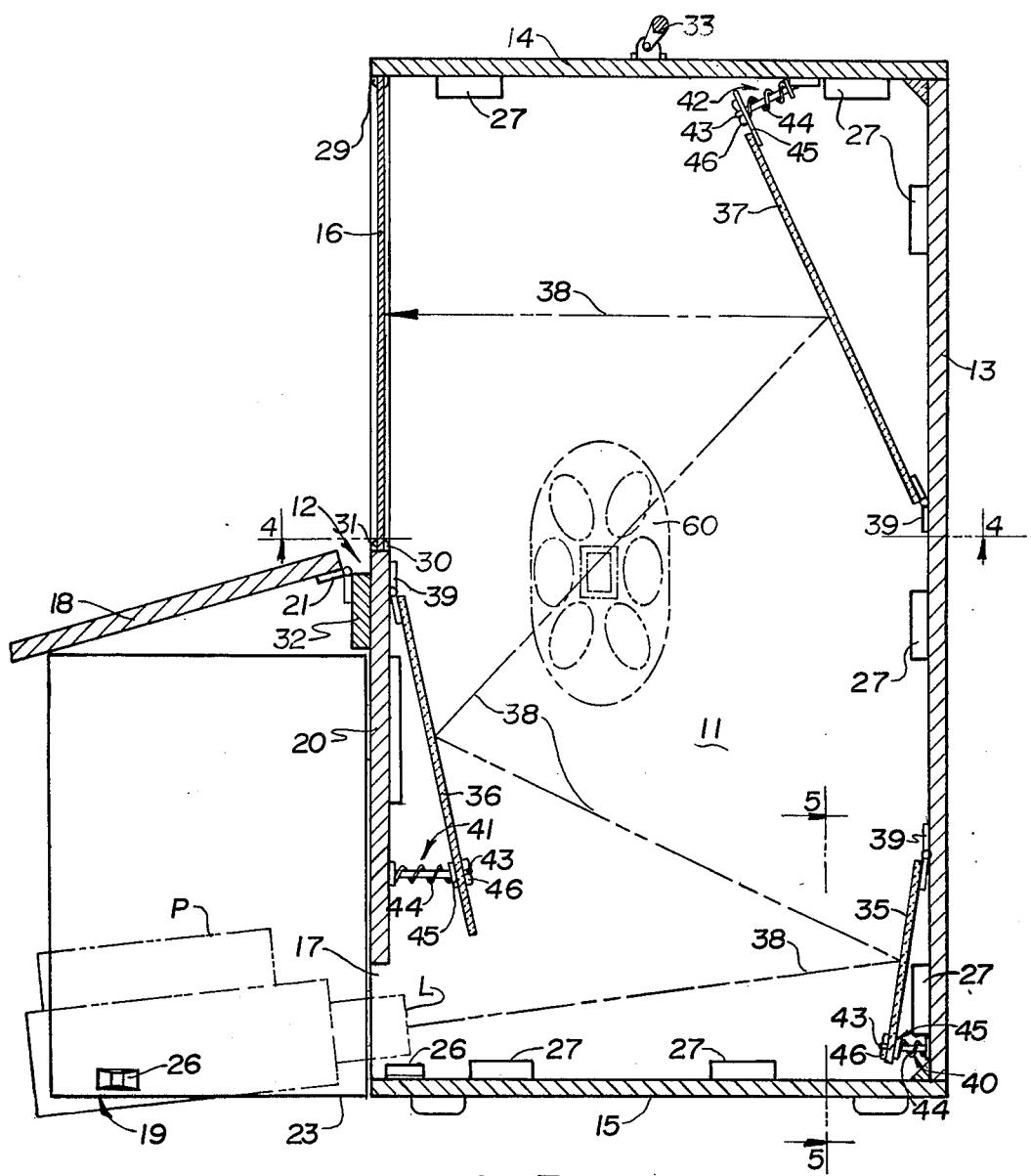
FIG. 3 is a vertical medial sectional view of the apparatus taken along line 3—3 of FIG. 2.

The mechanical structure and construction techniques utilized in forming the support housing 10, are perhaps better seen in FIGS. 3, 4 and 5. Basically, the support housing 10 is advantageously fabricated from panels of wood such as plywood, which are readily assembled into the illustrated configuration. The several wall structures, or elements, are readily secured at their junctures by appropriate fastening means and the structural integrity of the unit is further enhanced through utilization of glue-blocks 27 that may be secured to the interior of the structure at several locations along the corner junctions. A carrying handle 33 may be attached to the top closure wall 14 to facilitate transport of the apparatus.

In this illustrative embodiment, the front wall 12 of the housing and specifically the intermediate section 20, is adapted to be removably secured to the forward edges of the two side walls 11 at the indicated vertical position. This section may be advantageously secured in this position by means of screw type fasteners 28 which extend through the respective side walls 11 and into the end edge portions of the intermediate section 20. As will become readily apparent hereinafter, this removability feature is of particular advantage in enabling one to adjust the optical system as well as to affect periodic cleaning of that optical system for best image transmission characteristics.

Supported immediately above the intermediate front wall section 20 is the viewing screen 16 which is a glass plate having a rearwardly facing image forming surface and, as can be best seen in FIG. 3, is spaced a distance inwardly of the front edge of the respective side walls 11 and the top enclosure 14. This inward spacing of the viewing screen is determined by the dimensions of the screen mount and is such as to permit the door 18 to be pivoted to its closed position with the peripheral edges of the walls as shown in FIG. 1. Maintaining the viewing screen 16 in the desired position are pairs of rib-like elements 29 which cooperatively form channels for receiving marginal edge portions of the screen 16. These ribs 29 are secured to the inwardly facing surfaces of the side walls and top closure wall by suitable fastening means such as adhesives. It will be noted in FIG. 3 that the bottom edge of the viewing screen rests on an upper horizontal edge surface 30 of the intermediate front wall section 20. This section 20 is also provided with a horizontally extending rib 31 which is of a height to overlie the bottom horizontal edge portion of the viewing screen. An objective of this rib 31, as well as the ribs 29, is to assure that the screen 16 will be completely enclosed at its forwardly facing surface and thereby assure that no environmental light would be able to enter the housing from the front of the apparatus around the edges of the viewing screen.

As indicated, the removability feature of the intermediate front wall section 20 is to enable one to open up the housing structure to facilitate cleaning of the optical system as well as enable one to readily adjust the optical components for proper relative alignment for transmission of an image onto the viewing screen 16. Accordingly, it will be noted that upon removal of the intermediate front wall section 20, disassembly being accomplished by removal of the fastening screws 28, that one may then slide the viewing screen 16 along the slot formed by the rib 29 into the area at the lower end of the housing structure at this front wall. The vertical dimensions of the housing are such that viewing screen can be fully withdrawn from its normal position and thus enable one to clean the reverse side of the screen as well as the optical system components within the interior of the housing. This removal and its reverse assembly procedure can be best accomplished by positioning the housing in a horizontal position with the back wall 13 lying on a suitable support surface. Removal and reassembly of the viewing screen is not hindered by the doors 18 or 19 in that the bottom doors may be swung to an open position and it is noted that the upper door 18 is secured to a hinged mounting bar 32 carried by the intermediate front wall section 20 and is thus concurrently removed with that wall section.

Forming the optical system of the apparatus is a set of three reflectors 35, 36 and 37 which are mounted in the interior of the support housing 10 as can be best seen in FIGS. 3, 4 and 5. These three mirrors are positioned within the housing and designed to result in an optical path of transmission for a projected image with this path indicated by the broken lines 38. As diagramatically illustrated in FIG. 3, this optical path 38 extends from a projecting lens L which is incorporated in an appropriate visual image projection device P. The projection device P is positioned substantially externally of the support housing 10 and is oriented so that the lens will direct the optical image inwardly of the housing along the indicated path 38 for reflection from the several reflectors and ultimately onto the rear or imaging surface of the viewing screen 16. Each of the mirrors 35, 36 and 37 is formed from a specifically dimensioned glass plate having a reflecting surface formed on a rear face of the plate. These mirrors are sequentially increased in size proportionately and in accordance with their relative position along the optical path so that each will be capable of accepting the image size at that point on the optical path. The sizes of the glass plates forming the reflectors are determined in accordance with normal optical computation procedures and will be dependent upon the image projected from the projector P through its associated lens system L.

In this embodiment of the invention, these reflectors are rectangularly shaped and are mounted in the support housing 10 by appropriate hinge elements 39 that are rigidly secured to respective surfaces of either the rear wall 13 or the intermediate front wall section 20 as illustrated. Also interconnecting with each of the respective mirrors or reflectors 35, 36 and 37, are the respective adjusting means 40, 41 and 42. Each adjusting means include a threaded bolt element 43 which is secured at one end to the rear wall 13 or the front wall 12, respectively. Mounted on each of the respective bolts 43 is a helical compression spring 44 which bears at one end against a supporting base of the respective bolt and at the other end against a surface of an attachment plate 45 secured to the rear of a respective reflector. The attachment plate 45 is provided with an aperture for receiving the bolt and permit relative movement of the bolt through that aperture. A securing device, such as a wing nut 46 is threaded onto the outer end portion of the bolt and operates against the attachment plate 45 to maintain the interconnection of the plate with the bolt. Referring specifically to FIG. 3, it will be seen that, with each of the reflectors 35, 36 and 37, secured by the respective hinges 39 for pivotable movement about a horizontal axis, the adjusting means 40, 41 and 42 can be manipulated to alter the relative angular position of each reflector with respect to its supporting surface. This angular adjustment effects the relationship of the mirror or reflector surfaces with respect to the optical path and, accordingly, can affect this path as it traverses the support housing 10 to the screen 16.

In accordance with this invention, the optical system is designed to incorporate three reflectors to materially enhance the optical features of this device. Specifically, utilization of the three reflectors enables one to increase the length of the optical path for a specific dimensioned support housing and thereby effect an enlargement of the optical image. This enlargement is thus obtained without having to increase the size of the support housing 10 to a dimension which makes it difficult to carry and to store and eliminates the necessity to purchase a special lens or lens system to obtain enlargement. It is one of the objectives of this invention to provide an apparatus of this nature which is readily transportable to a desired location and which does not require an exceptionally large storage space.

A further advantageous feature, through utilization of the three reflector optical system, is that the clarity of the image seen on the viewing screen 16 is materially enhanced through minimization of the dual reflection that is otherwise obtained in optical systems wherein the optical path is incident to the mirror surfaces at a relatively large angle. As can be best seen in FIG. 3, the angle of incidence is maintained at a relatively low angle and it will be noted that this angle is not in excess of 25° with respect to the mirror 37 which is the last mirror positioned in the optical path and is positioned in the upper end of the housing 10. The arrangement of the mirrors is such that upper mirror 37 will be operative to direct the image along an optical path that is essentially normal to reviewing screen 16.

In this enbodiment, the projector P is preferably oriented to direct the image along a path that is upperwardly inclined at an angle of approximately 5° to the horizontal axis. The first mirror 35, which intercepts the optical path, is oriented by its adjusting means 40 at an angle of approximately 8° to the rear wall 13. Accordingly, the angle of incidence with respect to the mirror 35, is 8°. With the particular illustrated support housing 10, the second mirror in this optical path is indicated as reflector 36 and is approximately oriented at an angle of 12° with respect to the vertical front wall 12. Consequently, the angle of incidence of the optical path 38 with the arrangement of the components indicated will also be 12°. As a result, the combination of the angles of incidence will not exceed 25° which occurs at the upper mirror 37 and which mirror is angularly positioned at approximately 25° to the rear wall 13.

Angularly adjusting the respective mirrors and vertically orienting these mirrors with respect to each other along the optical path to maintain this low angle of incidence is particularly effective in minimizing the likelihood of dual or double image reflection. The double image reflection will occur where there is a high degree angle of incidence and there will be an image reflected not only at the rear silvered surface of the reflector but there will be a secondary image reflected at the front surface of the glass plate. This effect is particularly noticeable where a plural reflector system is utilized as a dual reflection from the first mirror will result in a four image reflection with respect to a second mirror. This reflection multiplication is further increased by any subsequent reflectors in the optical system. Consequently, it will be readily seen that the specific optical arrangement of reflectors and number of reflectors in this apparatus provides an enhancement in the enlargement capabilities for a given image size as well as minimizing dual reflections which would otherwise result in an unacceptable blurring of the image on the viewing screen 16.

In accordance with the principles and concepts of this invention, the support housing 10 is designed to effectively limit and prevent the entrance of extraneous and ambient light that may be present in the viewing area and also, the formation of unwanted images on the screen 16 of objects located in the vicinity of the device. The entrance of such light will necessarily diminish the contrast of the image projected onto the screen 16 and, in some instances, can be so great as to require that positive steps and controls be effected to minimize light within a room. Such procedures are not acceptable in many instances where the image projected onto the screen 16 must be simultaneously or concurrently considered along with other visual material that is not similarly presented. Accordingly, there are many instances where one cannot reduce or diminish the normal ambient daylight conditions that are generally present during utilization of such apparatus, such as is common in teaching or lecture situations. To further reduce the effect of ambient light entering the housing 10, the interior of the housing is preferably coated with a non-reflecting paint which is most advantageously black in color. This results in a substantial absorption of any light that may enter the interior of the housing.

Further enhancing the utilization of the apparatus in minimizing the entrance of extraneous ambient light, is the door arrangement or configuration that can be obtained by the upper and lower doors 18 and 19 as best shown in FIGS. 2 and 3. To accomplish the objectives, the two sections 23 and 24 of the lower door 19, are positioned as shown in FIG. 2 to project forwardly from the housing and at a slight inwardly turned angle so that the outermost, upper corner of each section will underlie and support the upper door 18 which project forwardly in a substantially horizontal plane when it is in an open position. This arrangement of three door elements thus cooperates in forming a shield around the projector and restricting the possible area through which ambient light may enter the housing through the aperture 17. As previously indicated, this aperture 17 in the illustrative embodiment extends completely across the bottom of the housing for greater versatility in the position, particularly lateral positioning, and accommodation of a projector P and would otherwise be capable of admitting substantial ambient light.

It will also be noted that the latching hooks 22 which engage the respective screw-eyes 22a in holding the door 18 in closed relationship to the viewing screen, as shown in FIG. 1, are operational to cooperatively engage the door sections 23 and 24, as shown in FIG. 2, to form a mechanically interlocked structure. In the illustrated open position of FIG. 2, each of the latching hooks 22, which are appropriately located on the edge of the upper door 18, may be swung into latching engagement with a respective one of ring-form handles 25 secured to the lower door sections 23 and 24. When thus latched, the doors 18 and 19 form a structurally stable arrangement that will not be readily dislodged. A particular advantage is that the bottom door sections 23 and 24 will not be capable of being inadvertently moved outward to a position where the upper door 18 could then drop onto a projector and possibly damage the projector. Another advantage is that the apparatus may be picked up and moved in configuration of FIG. 2 without any need to return the doors to their closed position.

It must also be remembered that a projector P of any of the conventional types, whether a slide projector or a movie projector, must necessarily include a very strong light source for image projection. The conventional projection apparatus are not light sealed which means that there will also be light emitted from the projector other than through the lens system. The arrangement of the doors 18 and 19 prevents this light from effectively traveling from the projector into the viewing area where the observers may be seated in close proximity to the apparatus. The vertical height of the aperture 17 is maintained at a minimum in order that light eminating from the upper portions of the projector P, which is the usual case, will not be able to readily enter the support housing 10 through the aperture.

A further particularly advantageous feature of the multiple door arrangement is that these doors may be manipulated to effectively accommodate various sizes of projection devices. For example, in the illustrative embodiment, the arrangement can accommodate most motion picture projectors that are used in home or classroom viewing and can readily accommodate all of the common slide projecting equipment. By providing suitable means for adjusting and supporting the upper door 18 in a downwardly inclined position, such as between the opened bottom door section 23 and 24, it is possible to further reduce the open areas that are associated and available for emination of light from the projector or conversely, the entrance of light into the interior of the support housing 10.

Figure 6:
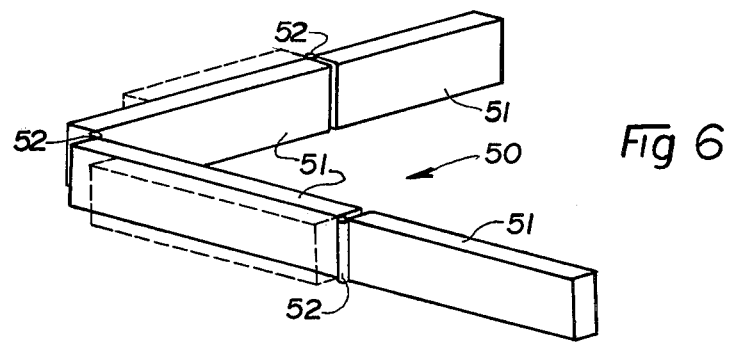
FIG. 6 is a perspective view of an auxiliary base support.

Further facilitating use of the apparatus with larger size projecting apparatus, a suitable elevating base 50 is provided as an auxiliary component of this structure. As shown in FIG. 6, this elevating base 50 comprising a V-shaped device which can be positioned beneath the housing with the bottom closure wall 15 resting on the upper edge of the base. The V-shaped element is formed from four structurally rigid sections 51 that may be fabricated of wood with each of the sections being interconnected at their respective junctures by hinges 52. The hinged interconnection of the several sections enables this elevating base to be folded up into a small compact storage configuration with each leg folded in half, as shown in broken lines, and the two legs pivoted together. For storage of the elevating base 50, the interior of the support housing 10 is provided with a compartment 53 that is positioned at one lower corner thereof, as best seen in FIG. 5. This compartment includes vertical and horizontal side walls 54, 55 forming, in cooperation with the housing walls 11 and 15 an elongated, open-ended compartment to receive the elevating base. There is ample room within the housing for this compartment in that the first reflector 35 is of a relatively small size and does not extend completely across the housing between the vertical side wall 11.

There are many other additional aspects of the illustrative embodiment which enhance its utilization in various situations. For example, the viewing screen 16 may be advantageously formed with a blue tint so as to be compatible with film which is primarily designed for use with artificial light sources. Such film, when utilized in an outdoor environment, will be affected to the extent that, without compensation of a blue tint in the viewing screen, it will render an inaccurate color representation of the subject matter. A blue tine screen thus enables use of an indoor film in daylight without requiring compensating filters on the camera.

A further modification of the apparatus to enhance its versatility, is the incorporation of audio speakers which may be mounted on the vertical sidewalls 11 thereby providing a convenient source of sound for systems that include an audio section. Mounting of such a speaker 60 is indicated in broken lines in FIG. 3 with it being understood that preferably two such speakers would be utilized with one speaker being mounted on each of the side walls. The side walls would also be modified to the extent that they would be provided with appropriate sound transmitting openings. These are not otherwise indicated in the several drawings and the construction of the mounting of such speakers will follow well known principles of construction.

A further favorable attribute of the apparatus, when utilized with a projector which can be exteriorally positioned as indicated in the several drawings, is the versatility obtained in selecting portions of an image which are to be projected onto the viewing screen. It will be readily apparent that positioning the projector a greater distance then that indicated in FIG. 3 so as to further increase the optical path, will also result in a further enlargement of that image. This enlargement of the image along with positioning of the projector either laterally or vertically with respect to the desired optical path, will be effective in permitting selection of a specified area of an image which is to be observed. This is particularly useful in providing a quick enlargement of a selected image area and can be useful in enabling one to also photograph the image that is thus formed on the viewing screen 16. While the clarity of such a photograph may not be that which could be obtained through the relatively expensive enlargement of the film itself, it nevertheless provides a convenient means of obtaining enlarged photographs areas of a previously taken picture.

It will be readily apparent that a novel and particularly useful rear screen viewing apparatus is provided by this invention. This apparatus, in utilizing a three element reflector optical system, permits one to obtain an adequately enlarged image on the rear imaging surface of a viewing screen. This arrangement of the three reflecting surfaces, permits the projecting device to be positioned at the front of the support housing where it is convenient to operate, by the person or persons viewing the resultant images. The structure is particularly suitable for utilization in many environmental light conditions that may be encountered without having the distracting effect of other external images entering the system and being subsequently either displayed on the viewing screen or interfering with the clarity of the projected image. The apparatus is extremely versatile and is capable of presenting an exceptionally clear image for viewing under many adverse environmental light conditions.

Having thus described this invention, what is claimed is:

1. A rear screen viewing apparatus for use with visual image projection devices comprising
    a support housing of elongated tubular configuration having a longitudinally extending peripheral wall structure and an end closure wall at each end thereof,
    a viewing screen mounted in said peripheral wall structure and supported by said housing in longitudinally extending relationship to said housing, said screen having an imaging surface facing inwardly of said housing,
    an aperture formed in said peripheral wall structure in longitudinally spaced relationship to said viewing screen for projection of an optical image interiorly of said housing from a visual projection device positioned substantially exteriorly of said housing, and
    an optical system for transmitting an optical image along a path from the visual image projection device and onto the imaging surface of said viewing screen, said optical system including three reflectors disposed in relatively axially spaced relationship with a first of said reflectors disposed in relatively axially spaced relationship with a first of said reflectors disposed in the optical path of an image projected from said visual projection device to first receive the image thus projected, a second of said reflectors disposed in the optical path to reflect an image substantially normal to said imaging surface, and a third of said relectors disposed relative to said first and second reflectors for transmitting of an optical image from the first to the second reflectors,
    said support housing including a plurality of door elements which are mounted thereon for pivoted, swinging movement between a position in closed relationship to said housing and a relatively open position cooperatively forming a light shield for a visual image projection device that may be disposed immediately in front of said housing at said aperture, said plurality of door elements including a first door mounted on said housing vertically above said aperture by hinge means for pivoting of the first door about a horizontal axis between a closed, vertically extending position and an open, laterally outward projecting position, and a second door having two sections mounted on said housing at opposite sides of said aperture by respective hinge means for pivoting of each section about a vertical axis between a closed position with respect to said housing and an open, laterally outward projecting position, said first and second doors forming an inverted, U-shaped channel when in an open configuration and thereby forming said light shield.

2. A viewing apparatus according to claim 1 wherein said reflectors are disposed relative to the optical path to maintain the angle of incidence of the optical path with respect to each of said reflectors less than 45°.

3. A viewing apparatus according to claim 1 wherein said reflectors are disposed relative to the optical path so that the angle of incidence of the optical path with respect to each of said reflectors does not exceed 30°.

4. A viewing apparatus according to claim 1 wherein said second reflector is disposed such that the angle of incidence of the optical path thereto is substantially 25° and the angle of incidence of the optical path with respect to said first and third reflector has a cumulative total of substantially 25°.

5. A viewing apparatus according to claim 1 wherein said reflectors are disposed relative to the optical path such that the angle of incidence with respect to said second reflector is substantially equal to the cumulative total of the angle of incidence of the optical path with respect to said first and third reflectors.

6. A viewing apparatus according to claim 5 wherein the angle of incidence of the optical path with respect to said second reflector is substantially 25°.

7. A viewing apparatus according to claim 1 wherein said viewing screen is a planar sheet disposed in substantially normal relationship to the optical path of an image projected interiorly of said housing.

8. A viewing apparatus according to claim 7 wherein said aperture is formed in said housing at a position whereby the optical path for projection of an image from a visual projection device may be substantially normal to the plane of said viewing screen into incident relationship to said first reflector.

9. A viewing apparatus according to claim 8 wherein said reflectors are relatively disposed to effect transmission of an image along the optical path in a single plane oriented substantially normal to the plane of said viewing screen.

10. A viewing apparatus according to claim 1 wherein each of said reflectors are mounted in said housing by mounting means retaining each respective reflector in a predetermined angular position with respect to the optical path, each said mounting means selectively adjustable for positioning the respective reflector in a predetermined angular position.

11. A viewing apparatus according to claim 10 wherein each of said mounting means includes a hinge interconnected between said reflector and said housing permitting relative rotation thereof about an axis parallel to said viewing screen, and an adjustable connector interposed between said reflector and housing for securing the reflector in the predetermined position.

12. A viewing apparatus according to claim 1 wherein said first door is supported in its laterally outward projecting position by said second door sections.

13. A viewing apparatus according to claim 12 wherein said second door sections, when open, are disposed in underlying relationship to said first door and support said first door on upper edges thereof.

14. A viewing apparatus according to claim 1 wherein said first door overlies said viewing screen and said second door sections overlie said aperture when each is pivoted to a closed position.

15. A viewing apparatus according to claim 1 wherein said first door and said second door sections include cooperative latching means selectively operable to secure said doors into structurally interlocked relationship when in said open position.

* * * * *